(No Model.)
H. KUHN.
WATER PROOF AND SENSITIZED PHOTOGRAPHIC MOUNT.
No. 450,963. Patented Apr. 21, 1891.
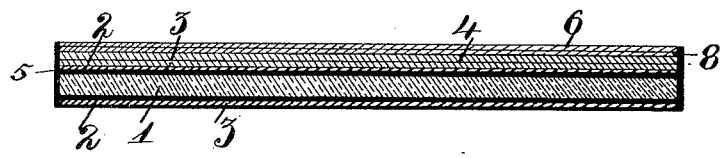
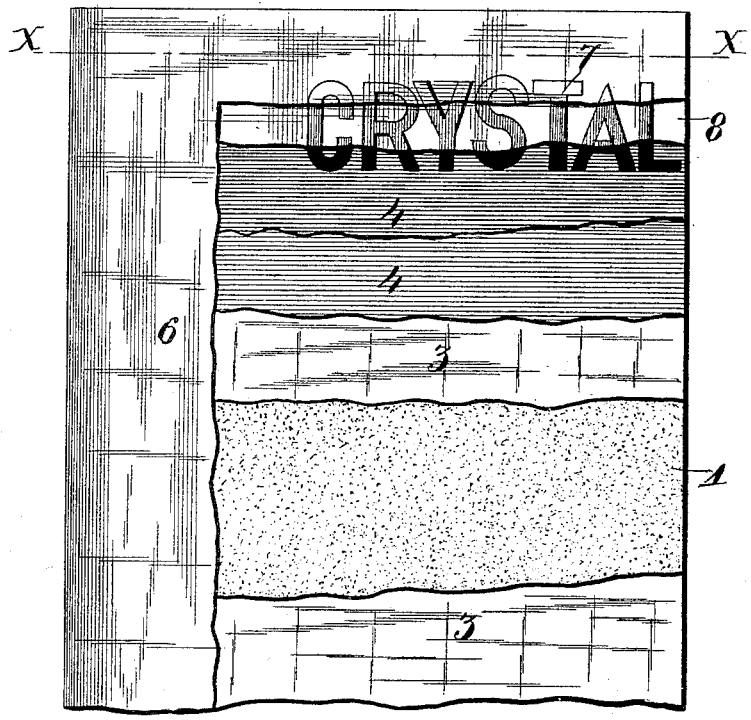
WITNESSES:
INVENTOR
Henry Kuhn

UNITED STATES PATENT OFFICE.

HENRY KUHN, OF SPRINGFIELD, MISSOURI, ASSIGNOR TO THE KUHN CRYSTALLOGRAPH MANUFACTURING COMPANY, OF SAME PLACE.

WATER-PROOF AND SENSITIZED PHOTOGRAPHIC MOUNT.

SPECIFICATION forming part of Letters Patent No. 450,963, dated April 21, 1891.

Application filed October 15, 1890. Serial No. 368,166. (No model.)

*To all whom it may concern:*

Be it known that I, HENRY KUHN, of the city of Springfield, Greene county, and State of Missouri, have invented certain new and useful Improvements in Water-Proof and Sensitized Photographic Mounts, of which the following is a full, clear, and exact description, reference being had to the accompanying drawings, forming a part hereof.

My invention relates to photographic mounts; and it consists in the new article of manufacture hereinafter specified and claimed.

In the drawings, Figure 1 is an enlarged section of a mount, the section whereof is taken on the line $x$ $x$ of Fig. 2; and Fig. 2 is a broken plan view of the same, showing the various stages of preparation.

1 represents a sheet of card-board, preferably of such size as will make a considerable number of mounts, which is first rendered water-proof by dipping into a solution of insoluble soap—such, for instance, as ordinary castile-soap—having a quantity of alum incorporated therewith, and then the sheet is dried by exposure to heat or otherwise, and thereby a shell 2, that is substantially waterproof, will be formed upon the outer surfaces of said sheet. The sheet is now treated in a bath composed of celluloid varnish or other suitable varnish which will impart an acid-proof coating to the sheet, this coating being indicated by the numeral 3. It is evident that the coating of celluloid varnish may be applied but to one side of the sheet, if so desired. After the coating last named has been suitably dried it is evident that the sheet is incased in a perfect water and acid proof film, which, however, has a comparatively rough or raw external surface, and as this would show in the finished photographs I place upon the coating of celluloid varnish upon one side of the sheet a comparatively thick and smooth coating or a series of superimposed coatings of barium nitrate, and gelatine of any suitable color or colors; or, if desired, this coating or these coatings may be composed of any other harmless material—such as chalk—which will make a very smooth and polished surface. The sheet thus treated is now passed between polishing rollers or cylinders, and is then ready to receive the sensitizing solution or sensitive coating, which preferably consists of a collodion or gelatine emulsion of suitable nature, and this is spread or coated evenly over the smooth surface last mentioned.

4 represents the coat or coatings of surfacing material, comprising barium nitrate and barium sulphate or colored chalk or chalks, and 6 indicates the sensitive coating.

Three or more colors, either distinct or blended, may be brought out by coating the cards with different-colored superposed coatings of aniline emulsions and one color being applied after the first has dried. To be more explicit, I first prepare a suitable aniline emulsion, or a number of different-colored emulsions, which may be made up of equal parts of alcohol, ether, pyroxyline, and chloride of strontium or chloride of lithium, and with the necessary quantity of coloring-matter, (aniline.) The colors will be held, as I have found, by the emulsion, and the whole will form a very thin sensitive film on the cards when spread thereon. In placing different-colored emulsions upon the cards an initial coating should be flowed over them or applied by suitable machinery (not shown) which I have devised for the purpose and which spreads the film more evenly than it can be spread by hand, and then this coating should be dried and another coating of different color applied over the first, and so on. Cards so treated present a very peculiar and pleasing effect, as one color melts away in the other. For landscape-work three or more colors may be employed, according to taste or as the subject may require. After drying by heat or otherwise the cardboard sheet is now ready for the cutting or stamping machine, whereby it may be stamped or cut into such desirable sizes as may be required—viz., cabinet, panel, &c.—and during the stamping operation the card-mounts so formed may or may not be provided with the usual beveled edges. However, after cutting a large sheet up into small card-mounts it will be evident that the edges of said card-mounts will be raw and must be waterproofed unless the waterproofing solution of insoluble soap penetrated throughout the thickness of the sheet. These edges are now waterproofed by handling them "en block"—that is, one hundred, more or less, are clamped in a single package by means of suitable clamps, and their edges are impregnated with a preferably warm mixture of rosin, paraffine, white wax, and olive-oil, which may be painted upon the edges of the card-mounts thickly and then dried by heat, whereby the above mixture will penetrate and saturate the edge of every single card and form thereon a waterproof shell 5. The card-mounts so prepared may now be worked through the different processes by the photographer—viz., toning, fixing, and final washing—and the water and chemical solutions will not penetrate their edges, as will be readily understood. It will thus be observed that I provide sensitized water-proof cards ready to print upon and the pictures being developed directly thereupon without the intervention of the usual sensitized paper. The cards so prepared should be preserved in suitable envelopes, and after printing they are passed through the usual different manipulations of toning, fixing, and washing out of the sensitive coating, and after this they can be either bodily drawn through a wash-wringer or otherwise dried, and are then ready to be burnished, as no mounting or cutting of paper is necessary.

In some cases, instead of treating the sheets of card-board by the waterproofing process above set forth, I may treat the paper-pulp in the paper-mill before it is rolled into sheets with insoluble soaps or other waterproofing material which will answer my purpose and then roll such pulp into suitable sheets and afterward treat them with the celluloid varnish and colored chalks, and the effect will be substantially the same in each case.

The novelty and advantages possessed by my improved article and process over the ordinary process of photographic printing are obvious.

First. No albumenized or specially-prepared paper is used, as such necessitates subsequent mounting on a card.

Second. The surface of my water-proof card-mount is comparatively hard and produces what I may term a "crystal" gloss upon simple burnishing, which an ordinary paper does not.

Third. The thickness of the card-mount prevents all curling when placed in the solutions, which is evidently not the case with ordinary thin paper, and therefore the card-mount is not liable to present the broken or cracked surface, as it is of itself held in a flattened condition, and there is no stretching of the paper, and consequently no distortion of the image, and a perfect copy is obtained.

Fourth. It will be observed that the sensitizing solution is coated upon a hard and water-proof surface, which, as I have found by experiment, necessitates but about fifteen minutes' washing to make a permanent print, as it is evident the chemicals used cannot penetrate the waterproofed card, only the outer coat or coatings of films being penetrated by them, and they are consequently quickly and easily washed out, whereas if ordinary sensitized paper had been used from four to six hours' washing would be necessary.

Fifth. Ordinary mounting—that is, mounting an ordinary print—is entirely done away with, and the consequent saving of perhaps twenty-five per cent. of the work is accomplished in making and finishing photographs.

Sixth. A general saving in chemicals is accomplished, as nothing but the film or films are to be treated, there being no paper to absorb the chemicals.

Seventh. These card-mounts, as an article of manufacture or as an article of commerce, are always ready for use, as they may be preserved for any length of time if properly packed.

Eighth. In using ordinary sensitized photographic paper blurred unsharp prints are often made, especially in damp weather or when the paper is laid upon the negative in a warm room and then exposed to the cold, expanding and contracting or wrinkling the same, producing a double and blurred image. All these are simply impossible in using my improved card-mounts, for the reason that they are not subject to atmospheric influence. The card is too thick to change its position by the action of heat or cold or dampness, and therefore prints will always be produced of the utmost sharpness and definition.

Ninth. The card-mounts may be washed, fixed, and toned while held in ordinary grooved boxes or racks so constructed as to prevent contact one with another, and by this manner of working more even tones are secured, the results are more satisfactory, and the permanency may be guaranteed.

Tenth. The card-mounts present what I may term a "crystalline surface," for the reason that without extra labor or enameling they have a brilliant or glossy surface resembling that of pure crystal.

Eleventh. By the ordinary printing process of the present time only two or three slightly-colored papers can be used. By my invention almost any color can be used as a ground for the picture with good success.

Twelfth. I propose to print any suitable matter in the form of letters or pictures on the surface of the card-mounts before or after the coating of barium nitrate has been applied, essentially before the sensitive coating has been applied. These letters or designs may be printed in gold, as gold is ordinarily used in such work, they being represented by the numeral 7, and then the sensitive coating may be applied in the manner before stated. This will produce a very attractive and pleasing effect.

Thirteenth. Three or more distinct colors on one photograph can be brought out by coating the cards with different-colored superimposed coatings, as before stated, aniline emulsions being preferred for this purpose and one color being applied after the first has dried.

Fourteenth. I do not desire to limit myself to any particular thickness of card-board, as it is evident I may make use of different thicknesses of same.

8 represents an additional coating of celluloid varnish or other waterproofing material, which I sometimes apply over the coat or coatings of colored surfacing material before mentioned, whereby said coat or coatings will be made water-proof. It will be observed that the color originally possessed by the cardboard will in no wise be impaired.

What I claim is—

1. A water-proof photographic mount in the form of a card having its edges coated with a mixture of rosin, wax, paraffine, and olive-oil, substantially as herein specified.

2. A photographic paper card having a series of different-colored layers or coatings of surfacing material applied to its surface, substantially as herein specified.

3. A water-proof card coated with differently-colored sensitized emulsions, substantially as set forth.

4. A water-proof card-mount coated with differently-colored sensitized emulsions in superposed thicknesses, substantially as set forth.

5. A water-proof paper card coated with a tinted emulsion and a coating of varnish applied over said coating of colored emulsion, substantially as specified.

In testimony whereof I affix my signature in presence of two witnesses.

HENRY KUHN.

Witnesses:
C. K. JONES,
JNO. C. HIGDON.